Sept. 29, 1953 W. A. RAY 2,653,622
AUTOMATIC SAFETY VALVE FOR FUEL BURNERS
Filed Oct. 18, 1948 5 Sheets-Sheet 1

WILLIAM A. RAY,
INVENTOR

John Flam
ATTORNEY

Sept. 29, 1953 W. A. RAY 2,653,622
AUTOMATIC SAFETY VALVE FOR FUEL BURNERS
Filed Oct. 18, 1948 5 Sheets-Sheet 3
*Fig. 3.*
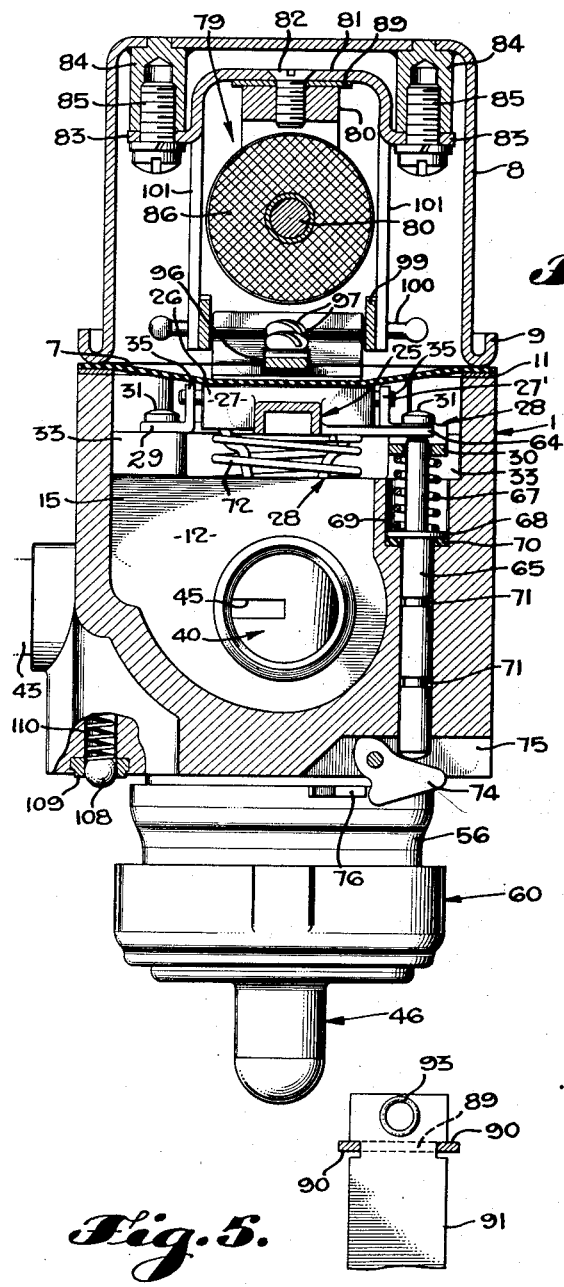
*Fig. 4.*
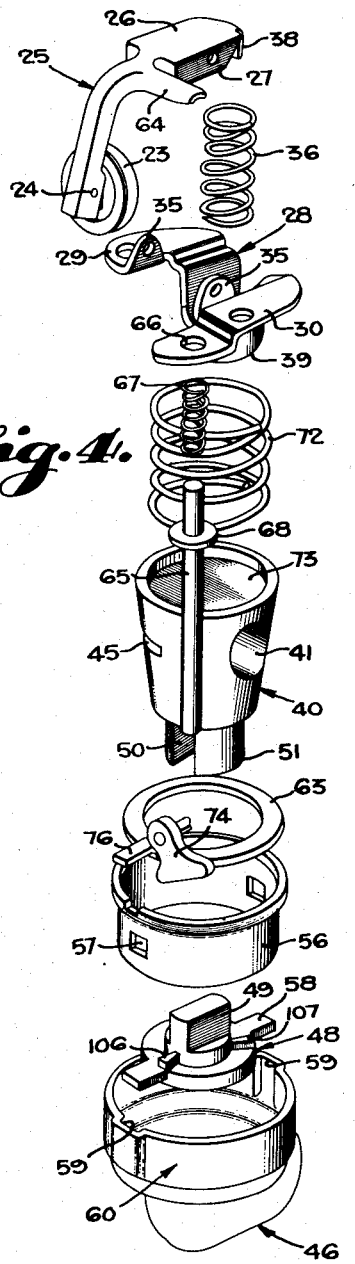
*Fig. 5.*
WILLIAM A. RAY,
INVENTOR
John Flam
ATTORNEY Sept. 29, 1953  W. A. RAY  2,653,622
AUTOMATIC SAFETY VALVE FOR FUEL BURNERS
Filed Oct. 18, 1948  5 Sheets-Sheet 4

WILLIAM A. RAY,
INVENTOR

John Flam
ATTORNEY

Sept. 29, 1953 W. A. RAY 2,653,622
AUTOMATIC SAFETY VALVE FOR FUEL BURNERS
Filed Oct. 18, 1948 5 Sheets-Sheet 5

WILLIAM A. RAY,
INVENTOR

John Flam
ATTORNEY

Patented Sept. 29, 1953

2,653,622

UNITED STATES PATENT OFFICE 2,653,622

AUTOMATIC SAFETY VALVE FOR FUEL BURNERS

William A. Ray, North Hollywood, Calif., assignor to General Controls Co., a corporation of California Application October 18, 1948, Serial No. 55,119

8 Claims. (Cl. 137—66)

This invention relates to valves for the control of the flow of fuel to burners; and more particularly to automatic safety valves that prevent flow of fuel to the burner in the event of failure of the pilot flame.

It has been common in the past to provide a shut-off valve controlling the flow of fuel so that the valve is held open while a pilot flame is in existence. For example, this may be done by providing a mechanical structure, such as a bimetallic element that is positioned to be affected by the pilot flame, or by the aid of any other form of heat responsive device, such as a vaporizable or expandable fluid. Another form includes a thermocouple or thermopile that has a hot junction heated by the pilot flame, and that provides sufficient electric power for an electromagnet that can hold an armature in attracted position. The armature is mechanically connected to a valve closure, which is held off its seat when the armature is in attracted position. However, when the pilot flame is extinguished, the armature moves away from the electromagnet and the closure is active to interrupt the flow of fuel to the main burner.

One of the problems encountered with such a system is that of reestablishing the pilot flame in a safe manner. Although the power available from the electromagnet is ample to hold the armature in attracted position, yet it is incapable of attracting the armture to that position. Accordingly, it is necessary manually to move the armature (and its connected valve closure) to this attracted position, and to light the pilot while the armature is thus held, and until the pilot flame is established.

Such a manipulation obviously permits flow of fuel to the main burner during this resetting operation, and there is an attendant danger of explosion at the burner because of the copious flow of unignited fuel.

In order to overcome these difficulties, arrangements have been proposed to make it possible to ignite the pilot flame and to lift the armature to attracted position without passing fuel to the main burner. Many arrangements of this character are complex, and have other serious disadvantages.

It is one of the objects of this invention to make it possible to perform the resetting operation in a safe manner, and without requiring manually to place the armature in attracted position.

In order to accomplish these results, use is made of a main rotary plug valve in addition to the safety shut-off valve, that may be operated to interrupt the flow of fuel and that then automatically serves to open the safety valve and to cause the pilot flame to maintain the valve in open position, either by the aid of a thermocouple or by a bimetallic structure or the like. In operating the main valve to close off the supply of fuel, the apparatus is so conditioned that ignition of the pilot serves to latch the safety valve in open position, but releases the safety valve closure when the pilot flame is extinguished. All this is accomplished without requiring manual operation of the armature.

It is accordingly another object of this invention to provide a mechanical latch for holding the safety valve in open position when the pilot flame is in existence. This latching function is automatic and may be accomplished by any of a plurality of devices that respond to the existence of the pilot flame.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Fig. 3 is a sectional view, taken along a plane corresponding to line 3—3 of Fig. 1;

Fig. 4 is an exploded perspective view of parts of the valve mechanism;

Fig. 5 is a detail sectional view, taken along a plane corresponding to line 5—5 of Fig. 1;

Figure 1:
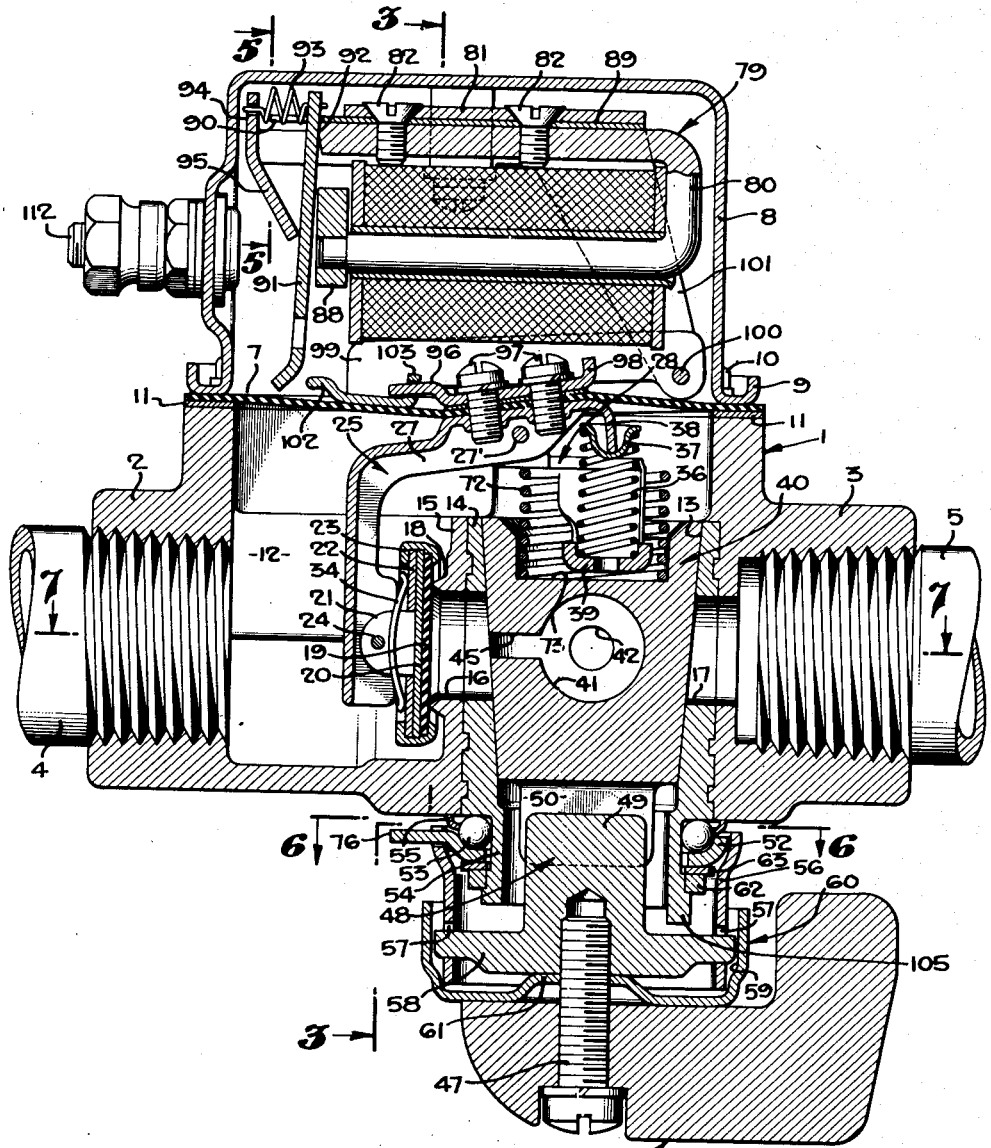
Figure 1 is a vertical sectional view of the valve incorporating the invention, the valve being in closed position.

As shown most clearly in Figs. 1, 2, 3 and 4, the valve includes a valve body 1 which may appropriately be made from cast metal; for example, the body 1 may be made as a die casting.

The valve body 1 has at its opposite ends the internally threaded bosses 2 and 3 into which are threaded, respectively, the inlet conduit 4 and the outlet conduit 5. The conduit 4 is connected to any appropriate source of fluid fuel, such as a gaseous fuel. The conduit 5 extends, as shown most clearly in Fig. 14, to a main burner 6.

The upper portion of the valve body 1 is open, and is shown as closed by a flexible, movable wall, such as the diaphragm 7. This diaphragm 7 is sealed against the top of the valve body 1 by the aid of a cap or cover 8 having a peripheral flange 9. This peripheral flange 9 may be fastened in place by a plurality of screws 10 engaging the flange 9 and urging the diaphragm 7 against a gasket or packing ring 11.

In order for the fuel to pass through the valve, a plug valve, as well as a safety valve, must be open. The operating parts of both of these valves are accommodated in, and are supported by, the valve body 1.

Thus, the inlet 2 communicates with a chamber 12 (see, particularly, Figs. 1 and 3). In the right-hand part of the body 1, a plug valve structure is accommodated. A downwardly tapered seat 13 is provided by a sleeve member 14. This sleeve member may be cast into an appropriate opening formed in the casing 1 and extending upwardly to the chamber 12 and downwardly to the exterior of the casing. The right-hand wall of the casing 1, as well as a wall 15, serves to define the opening in which the sleeve 14 is accommodated. An inlet port 16 is provided through the wall 15 and sleeve 14, and a similar outlet port 17 is provided in communication with the outlet conduit 5.

The port 16 opens into the chamber 12 and is controlled by a safety valve structure. In order to provide a seat for the safety valve closure, the wall 15 carries a tapered valve seat 18. This valve seat is adapted to be engaged by a yielding valve closure disc 19, made of rubber or the like. This valve closure disc is in contact with a rigid metal disc 20 carrying a retaining ear 21. A washer 22 is mounted over the ear 21, and serves as a backing for the closure structure. In order to hold the closure 19, disc 20, and washer 22 in place, a ring 23 is provided, the right-hand flange of which is turned inwardly to provide an abutment for the yielding closure member 19. A leaf spring 34, through which the ear 21 passes, serves to urge the elements 19, 20, and 22 against the inwardly directed flange of ring 23. The yielding closure disc 19, being made of rubber, or the like, readily accommodates itself against the seat 23.

The ear 21 is pivotally mounted, as by the aid of the pin 24, upon a lever 25. The configuration of this lever is shown to best advantage at the top portion of Fig. 4. The lever is provided with a wide arm 26 having depending side flanges 27. By the aid of these side flanges lever 25 may be pivotally mounted upon a pin 27' (see, also, Fig. 3). This pin 27' is mounted on a stationary axis, and is supported by the aid of the body 1. For this purpose there is provided a bracket member 28 (see, particularly, Figs. 1, 4 and 15). The bracket member 28 is provided with ears 29 and 30 for the accommodation of the fastening screws 31. These fastening screws pass into the integrally formed bosses above the wall 15. Vertical ears 35 are provided on the bracket 28 for the accommodation of pivot pin 27', the ends of which may be flattened.

Provisions are made to bias the safety valve closure member to the closed position of Fig. 1. For this purpose use is made of a compression spring 36. The upper end of this spring 36 engages the edge of a cup 37. The interior of this cup engages the downwardly extending flange 38 of lever 25. Accordingly, the compression spring 36 urges the lever 25 in a counter-clockwise direction.

Figure 15:
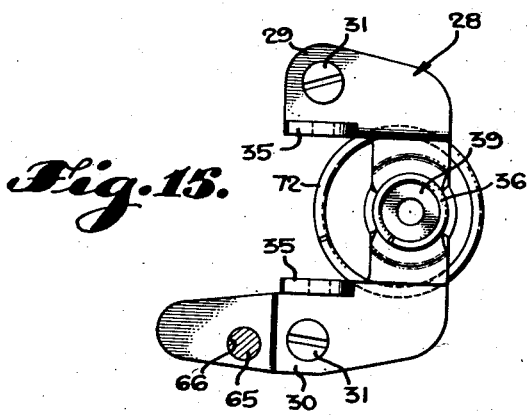
Fig. 15 is a plan view of a bracket and its associated parts utilized with the valve.

The lower end of the spring 36 rests upon a cup 39 which is formed integrally with the bracket 28 (Fig. 15).

Figure 14:
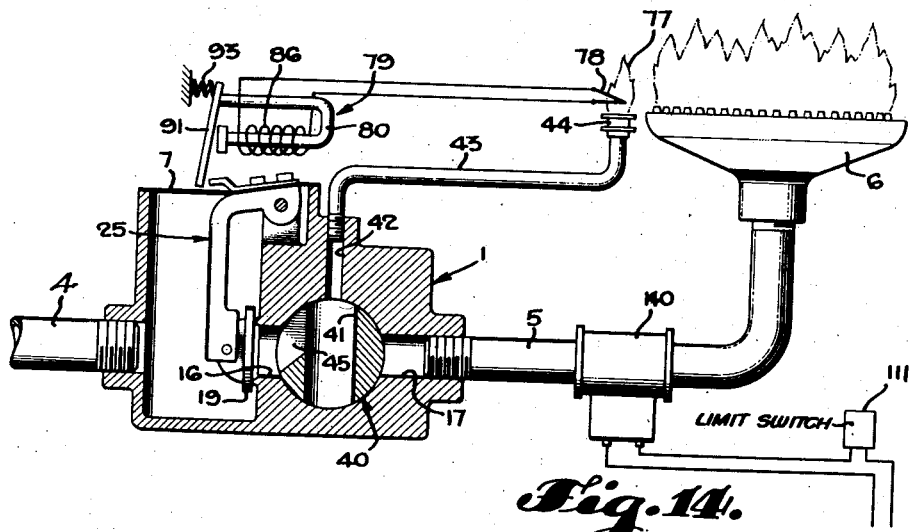
Fig. 14 is a diagrammatic representation of the valve as shown in use in connection with a main burner and pilot burner installation.

The plug valve is controlled by a rotary plug closure 40. In the closed position of Figs. 1 and 7, the port 41, through the plug 40, is transverse to the port 17 and, therefore, no fuel can flow through the outlet port 17. This port 41, however, is in alignment with the port 42, which communicates with a conduit 43 leading to the pilot burner 44 (Fig. 14). A sawcut or slot 45 is provided in the plug 40 transverse to the port 41. In this way, although flow of fuel to the outlet port 17 may be interrupted, it is possible to pass fuel to the pilot flame when the safety valve closure structure is open. This is indicated diagrammatically in Fig. 9, in which the closure 19 is shown lifted from its seat. Fuel can then pass from the inlet 2 into the chamber 12 and port 16 through the slot 45 and to the port 42.

The plug 40 is arranged to be manually controlled by the aid of a handle structure arranged below the body 1. This handle structure includes a handle proper 46 that is attached, as by a screw 47, to a valve actuator 48. This valve actuator has a projection 49. This projection is accommodated within a slot 50 formed in the extension 51 of the plug 40 (Fig. 4), and has a slight play therein.

Accordingly, when the handle 46 is manipulated, the plug 40 is moved correspondingly after the lost motion between the projection 49 and the slot 50 is taken up.

Figure 2:
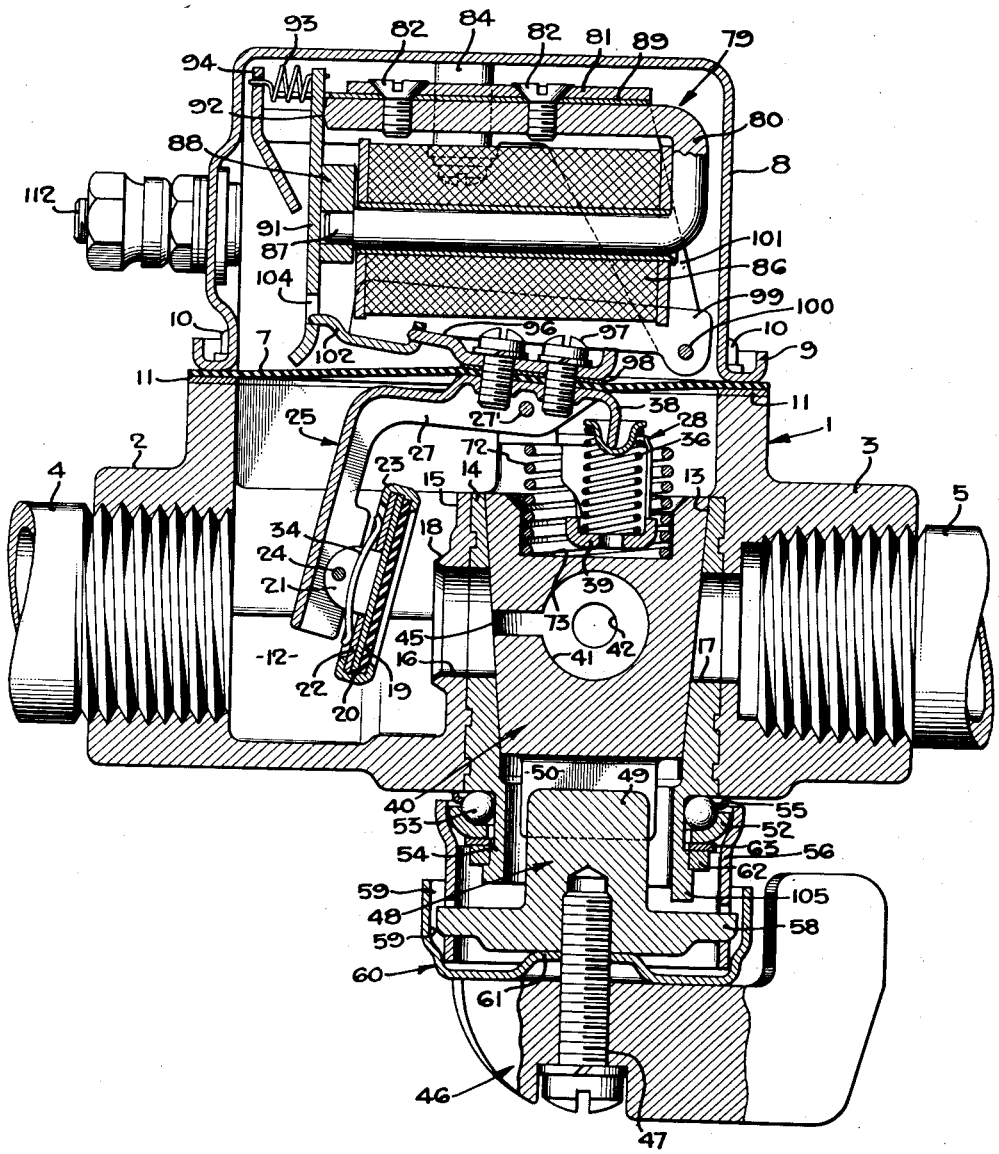
Fig. 2 is a view similar to Fig. 1, but showing the valve in open position.

The mounting of the handle structure is shown to best advantage in Figs. 1, 2, and 3. An outer ball race 52 serves to confine the balls 53 against the shoulder formed by the projection 54 on the sleeve 14. A retainer ring 55 is disposed around the balls 53. The ball race 52 is brazed, or otherwise attached, to a hollow cylindrical skirt member 56. This skirt member 56 has diametrically opposite openings 57 through which the transverse arm 58 of member 48 extends. This arm 58 also projects into the recesses 59 formed at diametrally opposite points in a cover member 60, thus positively coupling the actuator 48 to the member 60. This cover member 60 extends over the arm 58. It has an inwardly depressed portion 61 through which the screw 47 passes. In this way the screw 47 firmly holds the actuating member 48 to the cover member 60 and the handle 46. Accordingly, the handle 46, actuator 48, cover member 60, and skirt 56 are all mechanically and firmly connected together to move angularly as a unit.

In order to hold the outer race member 52 in position so as to provide a rolling bearing for the handle structure, with its associated skirt 56, use is made of a resilient, split ring 62 that engages a shoulder formed on the projection 54. Interposed between this split ring 62 and the outer race 52 is a washer 63.

Since the outer ring 52 is held firmly to the skirt 56 by brazing, or the like, and since the bar 58 serves to clamp the skirt 56 to the cover member 60 and handle 46, it is obvious that rotation of the handle member 46 is guided by the ball bearing structure; and this rotation can be effective to move the plug closure member 40 in the desired angular positions.

Figure 8:
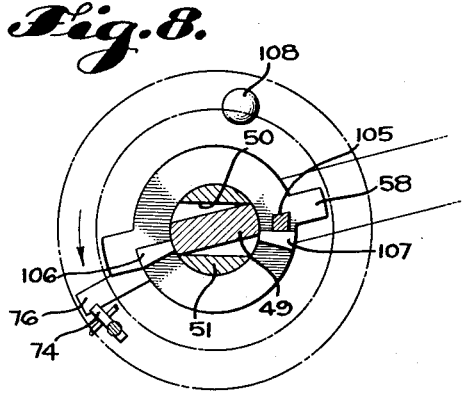
Figs. 8, 10 and 12 are views similar to Fig. 6, but illustrating different positions of the valve.
Figure 9:
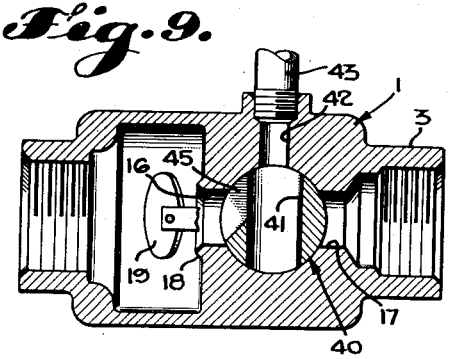
Figs. 9, 11 and 13 are sectional views, similar to Fig. 7, but showing the valve positions corresponding to Figs. 8, 10 and 12, respectively.

The arrangement is such that movement of the plug closure to the closed position of Fig. 9 serves to open the safety valve closure, as shown most clearly in Fig. 8. In this position the projection 49 has been moved in a counter-clockwise direction to take up the play between slot 50 and the projection 49. In this position the safety valve closure is lifted. How this is accomplished will now be described.

The lever 25, which serves to support the valve closure 19, is provided with an integral transverse arm 64 (see also Fig. 4). When this arm is urged upwardly, the lever 25 is moved in a counterclockwise direction about its pivot. This movement is effected by the aid of a push rod 65 (Figs. 3 and 4). This push rod 65 is further guided in the aperture 66 formed in the ear 30 of bracket 28 (Fig. 15). This push rod 65 is urged downwardly to inactive position by a compression spring 67. The upper end of the spring engages the lower surface of the ear 30. Its lower end engages a washer 68. This washer 68 is mounted upon the reduced upper end of the push rod 65 and is slidable within the cylindrical recess 69 in the body 1. A yielding gasket or packing washer 70 is shown as disposed in the bottom of this recess 69. Furthermore, one or more grooves 71 may be provided around the rod 65 for the accommodation of an appropriate lubricant.

The ears 29 and 30, as shown most clearly in Fig. 15, also serve as an abutment for the heavy compression spring 72 that serves to urge the plug 40 into firm contact with its seat 13. The lower end of the spring 72 is appropriately accommodated within a recess 73 in the top of plug 40.

Movement of the push rod 65 against the force of spring 67 is accomplished by the aid of a crank 74 (Figs. 3 and 4). This crank 74 is pivotally mounted in a slot 75 provided in the lower portion of the casing 1. Its inner arm engages the bottom of the recess 75 in order to limit clockwise rotation of the crank. The operating arm is in contact with the lower end of the push rod 65. The crank 74 may be urged in a counter-clockwise direction by turning the handle 46. For this purpose an actuator 76, formed integrally with the outer race 52 (Fig. 1) is utilized. This actuator 76 projects through a slot formed in the upper edge of the skirt 56.

When the projection 49 of member 48 is rotated to the position of Fig. 8, the crank 74 is actuated and the safety valve closure moved to the position of Fig. 2. In this position the plug 40 interrupts the flow of fuel to the outlet 17, thereby preventing flow of fuel to the main burner 6. However, fuel is now supplied to the pilot burner through ports 16, 45, 41 and 42. The handle 46 must be held in this position in order to compress the spring 67. As soon as the handle is released, the projection 49 returns to the position of Fig. 6 under the influence of spring 67; and, unless the safety valve closure is otherwise held in open position, this safety valve closure also closes.

In order to hold the safety valve closure in open position, it is necessary that the pilot burner 44 be ignited. This is accomplished while the handle 46 holds the valve open, as shown in Figs. 8 and 9. Although other flame or heat responsive devices can be used, in this instance a thermoelectric system is utilized. Within the pilot flame 77 there is disposed the hot junction of a thermocouple 78 (Fig. 14). When the flame 77 is in existence, electrical energy is generated which serves to operate an electromagnet structure 79. This electromagnet structure in turn serves, when energized, to hold or latch the lever 25 in the open position of Fig. 2.

The electromagnet structure 79 is conveniently placed within the casing or cover 8 above the diaphragm 7. It includes a U-shaped core 80. This core 80, as shown most clearly in Figs. 1 and 3, is attached to a bracket 81, as by the screws 82. This bracket 81 has oppositely directed ears 83 which overlie the ends of posts 84. These posts are appropriately attached as by welding to the top of the cover member 8. Screws 85 hold this bracket firmly in place. In this way the electromagnet structure is supported within the cover or casing 8.

Upon the lower leg or core 80 is mounted the coil 86, which is supplied with electrical energy from the thermocouple 78. Binding posts 112 mounted on the left hand side of cap 8 may be used to provide terminals for coil 86. The end of the lower leg of core 80 is provided with a reduced cylindrical portion 87 upon which a pole piece 88 is mounted.

Interposed between the bracket 81 and the upper leg of core 80 is a thin plate 89 (Figs. 1, 2 and 5). This plate extends to the left and has arms 90. A light armature 91 has slots in its opposite edges in which the arms 90 are engaged. In this way the armature is prevented from moving upwardly or downwardly. The armature 91 is pivoted on the knife edge 92 formed at the end of the upper arm of the core 80. The armature 91 is urged to the unattracted position of Fig. 1 by the aid of a light compression spring 93. This compression spring 93 has an end projecting into an aperture of an ear 94. This ear 94 is formed integrally with the bracket 81. It also has a downwardly extending portion 95 serving to limit the movement of the armature 91 away from the pole piece 88. The right-hand end of the spring 93 passes through an aperture in the upper end of the armature 91.

When the coil 86 is energized by electrical energy derived from the thermocouple 78, it is attracted to the position shown in Fig. 2. The armature 91 is purposely made light enough and is placed close enough to the pole piece 88 to complete this movement of the armature, although the thermocouple 78 provides very limited power.

The attraction of the armature 91 to the position of Fig. 2 serves to latch the lever 25 in the open position. For this purpose a latch structure is provided that is moved by movement of the lever 25 to the open position.

Thus, mounted upon the upper side of the diaphragm 7 is an arm 96. This arm 96 is attached to the lever 25 by the aid of screws 97. These screws 97 pass through the diaphragm 7 and are threaded into the tapped holes in the lever 25.

A washer 98 may be interposed between the member 96 and the diaphragm 7.

When the arm 25 is moved in a clockwise direction to the open position of Fig. 2, the member 96 is likewise moved. The member 96 serves to move a latch member 99 (Figs. 1, 2 and 3). This latch member 99 is pivoted at its righthand end by the aid of a pin 100, passing through the downwardly extending arms 101 of bracket 81. The ends of this pin may be flattened to limit its axial movement. The left hand end of the latch member 99 carries a latch projection 102. This latch projection 102 extends toward the right, and is provided with an upright projection 103. The left hand end of member 96 passes through an aperture in this projection.

In this way, when the lever 25 is moved to the open position by the operation of push rod 65, the member 96 serves to lift the latch member to the position of Fig. 2. Now, when the electromagnet 79 is energized, the armature 91 moves to the position of Fig. 2, and the left hand end of the latch projection 102 is engaged within the aperture 104 provided in latching member 91.

This mechanical latching of the safety valve in open position is automatically effected while holding the handle 46 in safety valve opening position (corresponding to Figs. 8 and 9). As soon as the pilot flame 77 is established, the handle 46 may be released and the safety valve closure structure is maintained in open position.

Thereafter, the handle 46 can be turned to open the main valve. This is accomplished by movement of the handle to correspond to the position of Figs. 10 and 11. Here, the port 41 of plug 40 is aligned with the inlet port 16 and the outlet port 17. Fuel to the pilot burner is maintained through slot 45.

Upon failure of the pilot flame 77, the armature 91 is urged to the unattracted position of Fig. 1. The latch projection 102 is released, and the safety valve is closed by the action of spring 36. Fuel flow is interrupted both to the main burner 6 and the pilot burner 44. The pilot light must then be reestablished in order to make it possible to permit the fuel to pass to the main burner 6.

Figure 12:
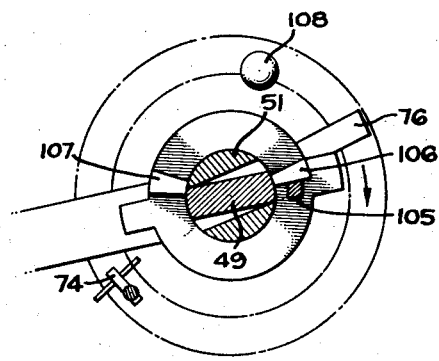

It may be desirable at times to turn the plug closure 40 to a fully inactive position where flow of the pilot burner is interrupted even when the safety valve is open. In order to effect this, the handle is turned to cause the plug to assume the position of Figs. 12 and 13. Here, the projection 49 of the handle structure has moved to its extreme position, and the port 41 is out of communication with the inlet port 16. The slot 45 is now no longer in a position to supply fuel to the pilot burner port 42.

Figure 6:
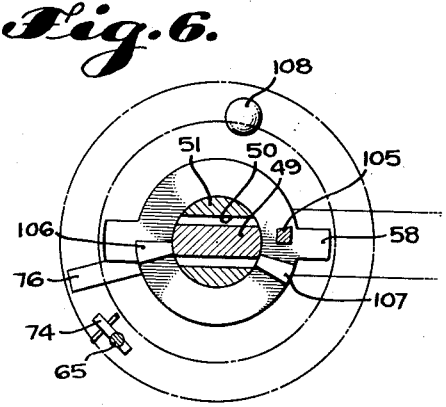
Fig. 6 is a diagrammatic sectional view, taken along a plane corresponding to line 6—6 of Fig. 1, and illustrating the valve in normal, closed position.
Figure 7:
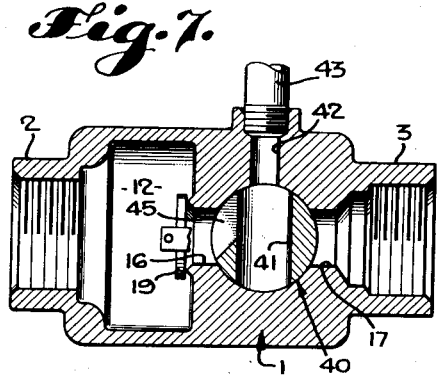
Fig. 7 is a sectional view, taken along a plane corresponding to line 7—7 of Fig. 1, and corresponding to the closed position of the valve as illustrated in Fig. 6.
Figure 13:
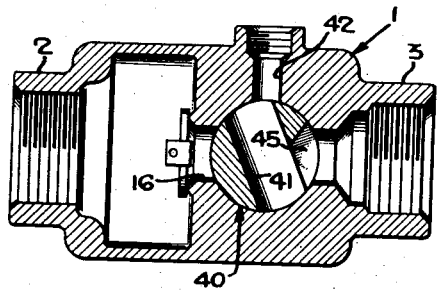

The extent of movement of the plug between the positions of Figs. 7 and 13 is limited by the aid of stops. Thus, the projection 54 of sleeve 14 is provided with a stop abutment 105. This stop is shown diagrammatically in Figs. 6, 8, 10, and 12. The actuator 48 is provided with corresponding stops 106 and 107. In the extreme position of Fig. 8, where the actuator 47 is moved to open the safety valve structure, the stop 107 abuts the lower side of the stop 105. Now, as the actuator 48 is moved in a clockwise direction to the position of Fig. 12, the stop 106 contacts the upper side of the stop 105. The total movement of the projection 49, attached to the actuator 48, is slightly more than 180°. However, due to the lost motion between projection 49 and slot 50, the plug 40 is moved through an angle slightly less than the angle of movement of actuator 48.

In operating the system it may be assumed that the plug 40 is in a position corresponding to Figs. 6 and 7. The safety valve is closed, and the passage of fuel both to the pilot burner and the main burner is interrupted.

The projection 49 is central with respect to the slot 50 due to the action of the push rod spring 67 on the crank 74, and thence to projection 76. Now, the handle structure can be turned so as to bring the projection 49 to the position of Fig. 8. In this position the crank 74 for actuating the push rod 65 is urged upwardly and the lever 25 is moved to the open position of Fig. 2. While holding the handle in this position, the pilot burner 44 may be ignited. In a short time, the armature 91 is attracted and the safety valve maintained in open position. The handle structure can then be moved in a clockwise direction, as viewed in Fig. 10, to move the plug 40 to the fully open position of Fig. 11. Fuel can then be supplied to the main burner 6, as well as to the pilot burner, and the handle left in this position.

Figure 11:
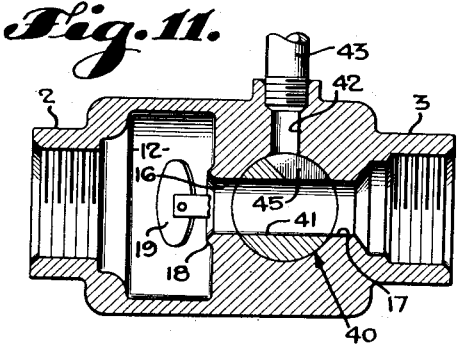

In order that there be a definite feel or stop for the operator to move the plug no farther than to the open position of Fig. 11, use is made of a ball detent. This ball detent is shown most clearly in Fig. 3. It includes a ball 108 held in a socket member 109 that is disposed in the lower face of the body 1. It is urged outwardly by a compression spring 110, but it may be pushed out of the way against the spring.

Figure 10:
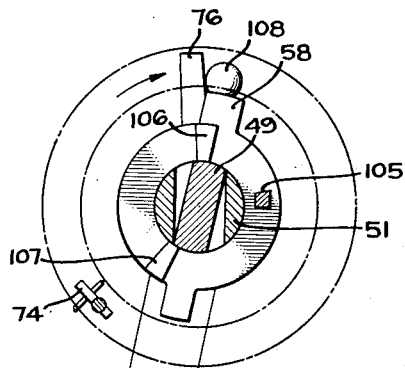

When the plug 40 reaches the position of Figs. 10 and 11, the actuator arm 76 is moved to a position in contact with the ball 108. In order to move the plug 40 to the totally closed position of Fig. 12, this arm 76 must first depress the ball 108 against the spring 110. Accordingly, the operator may move the plug 40 to the position of Fig. 10, and he will be warned by the excessive force required that to continue the movement of the plug would serve to bring the mechanism to the shut-down position of Figs. 12 and 13.

The main valve structure including the plug 40 is thus incapable of passing fuel to the main burner 6 unless the pilot is first established.

Control of the main burner 6 can be further accomplished by the aid of the electromagnetically operated valve 140 interposed in conduit 5. This valve opens in response to a condition-responsive device, or limiting switch such as the thermostat 111. Thus, although the plug valve may be open and the pilot established, the main burner 6 is ignited only when the valve 140 opens in response to the operation of device 111.

The inventor claims:

1. In a fluid control system: a valve body providing a plug valve seat and having inlet and outlet ports opening in said seat, as well as a chamber communicating with one of said ports; a rotary plug in said seat; an operator for the plug; a safety valve closure structure in the chamber for controlling the said one of said ports and biased to closed position, said safety valve closure structure including a pivotally mounted member and a closure carried by the member; a flexible wall defining said chamber and attached to the member; an electromagnet structure supported externally of said wall and having an armature that is moved to attracted position only in response to energization of said electromagnet;

a latching member attached to the pivotally mounted member externally of the wall for movement along with said safety valve closure structure; means responsive to a rotary movement of the operator only while the plug valve remains closed, to open the safety valve closure; said armature having a part thereof when said safety valve closure is in open position for engaging the latching member to hold the safety valve structure in open position when the armature is in attracted position; and means biasing said armature to disengaging position.

2. In a fluid control system: a valve body providing a plug valve seat and having inlet and outlet ports opening in said seat, as well as a chamber communicating with one of said ports; a rotary plug in said seat; an operator for the plug; a safety valve closure structure in the chamber for controlling the said one of said ports, and including a pivotally mounted member and a closure carried by the member; a flexible wall defining said chamber and attached to the member; an electromagnet structure supported externally of said wall and having an armature that is moved to attracted position only in response to energization of said electromagnet; means urging said safety valve closure structure to closed position; means responsive to a rotary movement of the operator only within an angle during which the plug valve is closed, for opening the safety valve closure against said urging means; a latching member attached to the pivotally mounted member externally of the wall for movement along with said safety valve closure structure; said armature having a part thereof effective when said safety valve closure is in open position for mechanically engaging the latching member to hold the safety valve structure in open position when the armature is in attracted position; and means for biasing said armature to releasing position.

3. In a safety valve structure: a valve body having a main inlet and outlet port, a main valve closure, as well as a chamber into which one of said ports opens; a movable safety valve closure in the chamber and biased to closed position; said safety valve closure cooperating with said one of said ports; a flexible wall defining said chamber; means dependent upon said main valve closure being in closed relationship with said outlet port for opening said safety valve closure; and means movable independently of said safety valve closure opening means for latching said safety valve in open position after said safety valve closure is moved to open position and arranged externally of the flexible wall, said latching means being biased to releasing position.

4. In a safety valve structure: a valve body having a main inlet and outlet port, a main valve closure as well as a chamber into which one of said ports opens; a movable safety valve closure in the chamber and biased to closed position; said safety valve closure cooperating with said one of said ports; a flexible wall defining said chamber; means dependent upon said main valve closure being in closed relationship with said outlet port for opening said safety valve closure; a latching member external of the chamber and attached to the wall and the safety valve closure for movement with said safety valve closure; and electrically energized means having a part thereof movable independently of said safety valve closure opening means for holding the latching member in position to maintain the safety valve closure open after said safety valve closure is moved to open position, said electromagnetically energized means being biased to releasing position.

5. In a fluid control system: a main valve having a movable closure; a safety valve in series with the main valve and having a movable closure biased to closing position; means for operating the main valve closure to open and close the main valve; means for opening the safety valve closure in response to movement of the operating means and effective only during that part of the movement in which the main valve is closed; a first latching member carried by and movable with said safety valve closure; a movable second latch member engageable with said first latch member and biased to releasing position for holding said safety valve closure in open position; and condition responsive means for moving said second latch member to latching position independently of said safety valve closure opening means.

6. In a fluid control system: a main valve having a movable closure; a safety valve having a movable closure biased to closed position; said valves being in series arrangement; means for operating the main valve closure; means effective by movement of the operating means for opening the safety valve closure only during that part of the movement of the operating means in which the main valve is closed; a movable mechanical latching means carried by and movable along with said safety valve closure for holding said safety valve closure in open position; an electromagnet having an armature that is movable to attracted position only in response to energization of said electromagnet, said armature being movable independently of said operating means, means on said armature when in attracted position for latching said latching mechanism when said safety valve closure is in open position.

7. In a safety fuel valve structure: a main plug valve having a rotary plug closure; an operator for the closure; said main valve having inlet and outlet ports; the plug closure having an opening cooperating with said ports such that flow of fuel between the inlet and outlet ports is interrupted during a limited angle of movement of the operator; a safety valve having a movable valve closure cooperating with one of said main valve ports and biased to closed position; means operated by movement of the operator only in said limited angle for moving the safety valve closure to open position; a latching means brought into latching position by movement of the safety valve closure to open position; and an electromagnet having an armature movable to attracted position only in response to energization of the electromagnet, and biased toward unattracted position; said armature being movable independently of said safety valve closure opening means; said armature and the latching means having engaging parts for holding the safety valve closure open after said safety valve is moved to open position.

8. In a safety valve structure: a valve body having a main inlet and outlet port as well as a chamber into which one of said ports opens; a movable safety valve closure in the chamber and biased to closed position; a flexible wall defining said chamber; a mechanical latch member carried exteriorly of the wall and attached to and movable along with the safety valve closure; and an electromagnet having an armature that is moved to attracted position only in response to the energization of the electromagnet and independently of said movable safety valve closure, said armature having means engageable with said latch member to hold said safety valve open, said armature being biased to unattracted position.

WILLIAM A. RAY.

References Cited in the file of this patent

UNITED STATES PATENTS

| Number | Name | Date |
|---|---|---|
| 1,240,023 | Brunk | Sept. 11, 1917 |
| 2,236,227 | Wantz | Mar. 25, 1941 |
| 2,258,811 | Ray | Oct. 14, 1941 |
| 2,403,611 | Ray | July 9, 1946 |
| 2,442,877 | Ray | June 8, 1948 |
| 2,475,430 | Kronmiller | July 5, 1949 |

FOREIGN PATENTS

| Number | Country | Date |
|---|---|---|
| 38,422 | Denmark | of 1928 |